(12) United States Patent
Lee et al.

(10) Patent No.: US 6,843,067 B2
(45) Date of Patent: Jan. 18, 2005

(54) AIR CONDITIONER AND METHOD FOR CONTROLLING ELECTRONIC EXPANSION VALVE OF AIR CONDITIONER

(75) Inventors: Won Hee Lee, Seoul (KR); Cheol Min Kim, Kyungki-do (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/674,002

(22) Filed: Sep. 30, 2003

(65) Prior Publication Data

US 2004/0098997 A1 May 27, 2004

(30) Foreign Application Priority Data

Nov. 22, 2002 (KR) .................... 10-2002-0073109

(51) Int. Cl.$^7$ .................................. F25B 7/00
(52) U.S. Cl. ................... 62/175; 62/222; 62/228.3; 62/510
(58) Field of Search .................. 62/175, 228.3, 62/222, 224, 228.5, 157, 231, 510

(56) References Cited

U.S. PATENT DOCUMENTS

| | | | | |
|---|---|---|---|---|
| 3,252,297 A | * | 5/1966 | Leimbach ............... | 62/225 |
| 3,699,778 A | * | 10/1972 | Orth ............... | 62/225 |
| 4,549,404 A | * | 10/1985 | Lord ............... | 62/224 |
| 4,932,220 A | * | 6/1990 | Inoue ............... | 62/175 |
| 4,951,475 A | * | 8/1990 | Alsenz ............... | 62/117 |
| 6,453,690 B1 | * | 9/2002 | Kim ............... | 62/222 |
| 6,705,097 B2 | * | 3/2004 | So et al. ............... | 62/158 |
| 2003/0233838 A1 | * | 12/2003 | Lee et al. ............... | 62/175 |

* cited by examiner

Primary Examiner—Marc Norman
(74) Attorney, Agent, or Firm—Greenblum & Bernstein, P.L.C.

(57) ABSTRACT

Disclosed are an air conditioner for cooling or heating air in a room by compressing, condensing, expanding and evaporating a refrigerant, and a method for controlling an electronic expansion valve of the air conditioner. The air conditioner includes a plurality of compressors, for compressing a refrigerant, of which one or more are operated so that refrigerant compression capacity is variably changed according to the variation of a cooling/heating load; and an electronic expansion valve adapted to control the refrigerant compression capacity. The electronic expansion valve controls the flow rate of the refrigerant after one or more of the compressors are stopped, thereby rapidly achieving the pressure equilibrium at inlet and outlet pipes of the stopped compressor(s), shortening a time taken to allow the stopped compressor(s) to be re-operated, and improving reliability in operating the compressors.

18 Claims, 7 Drawing Sheets

AIR CONDITIONER AND METHOD FOR CONTROLLING ELECTRONIC EXPANSION VALVE OF AIR CONDITIONER

BACKGROUND OF THE INVENTION

1. Field of the Invention

The present invention relates to an air conditioner for cooling or heating air in a room and a method for controlling an electronic expansion valve of the air conditioner.

2. Description of the Related Art

Generally, an air conditioner is an appliance for cooling or heating an indoor space, such as a residential space, a restaurant, an office, or etc. The air conditioner comprises a compressor for compressing a refrigerant into a high-temperature and high-pressure gaseous state, a condenser for condensing the refrigerant passing through the compressor into a high-temperature and high-pressure liquid state, an expansion device for decompressing the refrigerant passing through the condenser into a low-temperature and low-pressure liquid state, and an evaporator for evaporating the refrigerant passing through the expansion device into a low-temperature and low-pressure gaseous state. The compressor, the condenser, the expansion device, and the evaporator are connected by a refrigerant pipe. The operation of such an air conditioner is controlled by a microcomputer.

A heat pump system-type air conditioner further comprises a direction change valve, such as a 3-way valve or a 4-way valve, adapted to change the flow direction of the refrigerant based on a cooling/heating function, thereby being selectively operated in a cooling or heating mode.

In the cooling mode of the air conditioner, an outdoor heat exchanger functions as the condenser, and an indoor heat exchanger functions as the evaporator. On the other hand, in the heating mode of the air conditioner, the outdoor heat exchanger functions as the evaporator, and the indoor heat exchanger functions as the condenser.

In the cooling mode, the air conditioner allows indoor air to pass through the indoor heat exchanger functioning as the evaporator, thereby discharging cold air to the room. In the heating mode, the air conditioner allows indoor air to pass through the indoor heat exchanger functioning as the condenser, thereby discharging warm air to the room.

A recently developed air conditioner employs an inverter-type compressor which can variably change its refrigerant compression capacity in accordance with a cooling or heating load in a room. Accordingly, it is possible to properly cope with the variation of the cooling or heating load, thereby optimizing the cooling or heating efficiency of the air conditioner.

Generally, a capillary tube or an electronic expansion valve may be used as the expansion device. The electronic expansion valve is mainly used as the expansion device for adjusting the flow rate of the refrigerant so that the cooling or heating capacity of the air conditioner can be variably changed.

The opening degree of a passage in the electronic expansion valve, through which the refrigerant passes, is controlled by a step motor.

Hereinafter, the operation of the above-described conventional controller in a cooling mode will be described in detail.

First, the compressor is operated in accordance with a cooling or heating load in a room, and then the refrigerant circulates through the compressor, the outdoor heat exchanger (functioning as a condenser), the electronic expansion valve, and the indoor heat exchanger (functioning as an evaporator), sequentially. Here, the electronic expansion valve in a closed state is controlled to be opened by a suitable opening degree.

In case that the cooling or heating load in the room is eliminated by the circulation of the refrigerant generated by the operation of the compressor, the compressor is stopped.

In this case, since the pressure at an outlet of the compressor is higher than the pressure at an inlet of the compressor, the refrigerant in a gaseous state flows from the outlet of the compressor to the inlet of the compressor as time goes by. That is, the refrigerant at the outlet of the compressor flows toward the outdoor heat exchanger, the electronic expansion valve, the indoor heat exchanger, and then the inlet of the compressor, thereby achieving the pressure equilibrium between the inlet and outlet of the compressor.

Particularly, in order to more rapidly achieve the pressure equilibrium between the inlet and outlet of the compressor by allowing the refrigerant in a high-pressure state at the outlet of the compressor to flow toward the inlet of the compressor through the electronic expansion valve, the electronic expansion valve is controlled to be completely opened by a constant opening degree.

Thereafter, in case that the compressor is re-operated under the condition in which the cooling or heating load is reduced according to the stoppage of the compressor, the electronic expansion valve is controlled to be closed again, and then to be opened again by the suitable opening degree.

Accordingly, a cooling or heating cycle is obtained by the circulation of the refrigerant of the compressor, thus performing a cooling or heating function.

In order to shorten a time taken to achieve the pressure equilibrium between the inlet and outlet of the compressor, the electronic expansion valve of the above conventional air conditioner must be controlled to be completely opened by the constant opening degree before the compressor is re-operated, and then to be closed after the compressor is re-operated. Thereby, a time taken to control the opening and closing of the passage of the electronic expansion valve is lengthened, thus causing a time taken to re-operate the compressor to be lengthened. Further, the opening degree of the electronic expansion valve is controlled by the step motor, thus causing noise for a comparatively long period of time.

SUMMARY OF THE INVENTION

Therefore, the present invention has been made in view of the above problems, and it is an object of the present invention to provide an air conditioner, in which the pressure equilibrium between inlets and outlets of re-operating compressors is rapidly achieved, in case that one or more of a plurality of compressors are re-operated, thus shortening a time taken to allow the compressors to be re-operated and reducing noise generated in controlling the opening degree of an electronic expansion valve.

It is another object of the present invention to provide a method for controlling an electronic expansion valve of an air conditioner, in which the flow rate of a refrigerant is suitably controlled so that the pressure equilibrium between inlets and outlets of one or more re-operating compressors is rapidly achieved.

In accordance with one aspect of the present invention, the above and other objects can be accomplished by the provision of an air conditioner comprising: a plurality of compressors, for compressing a refrigerant, of which one or more are operated so that refrigerant compression capacity is variably changed according to the variation of a cooling/heating load; inlet pipes allowing the refrigerant to be distributed and introduced into the compressors, and outlet pipes allowing the refrigerant from the compressors to be combined and exhausted; a condenser for condensing the refrigerant compressed by the compressors by heat-exchanging the refrigerant with air; an electronic expansion valve for expanding the refrigerant condensed by the condenser by passing the refrigerant through an expanded passage; and a microcomputer for controlling the electronic expansion valve to be opened by a designated opening degree so that the pressure equilibrium in the compressors is rapidly achieved, in case that one or more compressors are stopped in accordance with the variation of the cooling/heating load and then re-operated.

Preferably, the air conditioner may further comprise a plurality of pressure sensors respectively installed at the inlet and outlet pipes connected to the compressors for measuring pressures at the inlet and outlet pipes connected to the re-operating compressors, wherein the microcomputer controls the electronic expansion valve to be opened by the designated opening degree during a period when the pressures at the inlet and outlet pipes connected to the re-operating compressors sensed by the pressure sensors reach equilibrium.

Further, preferably, the air conditioner may further comprise a timer, to which a pressure equilibrium time, taken to allow pressures at the inlet and the outlet pipes connected to the compressors to reach equilibrium, is inputted in advance, for measuring the pressure equilibrium time, wherein the microcomputer controls the electronic expansion valve to be opened by the designated opening degree during the pressure equilibrium time measured by the timer.

Moreover, preferably, the microcomputer may set the designated opening degree of the electronic expansion valve so that the pressure equilibrium time is minimized, and control the electronic expansion valve to be completely closed when the pressure equilibrium in the compressors is achieved.

In accordance with a further aspect of the present invention, there is provided an air conditioner comprising: a plurality of compressors, for compressing a refrigerant, of which one or more are operated so that refrigerant compression capacity is variably changed according to the variation of a cooling/heating load; inlet pipes allowing the refrigerant to be distributed and introduced into the compressors, and outlet pipes allowing the refrigerant from the compressors to be combined and exhausted; a condenser for condensing the refrigerant compressed by the compressors by heat-exchanging the refrigerant with air; an electronic expansion valve for expanding the refrigerant condensed by the condenser by passing the refrigerant through an expanded passage; a plurality of pressure sensors respectively installed at the inlet and outlet pipes connected to the compressors for measuring pressures at the inlet and outlet pipes connected to the re-operating compressors; and a microcomputer for controlling the electronic expansion valve to be opened by a designated opening degree, during a period when the pressures at the inlet and outlet pipes connected to the re-operating compressors sensed by the pressure sensors reach equilibrium, in case that one or more compressors are stopped in accordance with the variation of the cooling/heating load and then re-operated.

Preferably, the microcomputer may control the electronic expansion valve to be completely closed when the pressure equilibrium in the compressors is achieved.

In accordance with another aspect of the present invention, there is provided an air conditioner comprising: a plurality of compressors, for compressing a refrigerant, of which one or more are operated so that refrigerant compression capacity is variably changed according to the variation of a cooling/heating load; inlet pipes allowing the refrigerant to be distributed and introduced into the compressors, and outlet pipes allowing the refrigerant from the compressors to be combined and exhausted; a condenser for condensing the refrigerant compressed by the compressors by heat-exchanging the refrigerant with air; an electronic expansion valve for expanding the refrigerant condensed by the condenser by passing the refrigerant through an expanded passage; a timer, to which a pressure equilibrium time, taken to allow pressures at the inlet and the outlet pipes of the re-operating compressors to reach equilibrium, is inputted in advance, for measuring the pressure equilibrium time, and a microcomputer for controlling the electronic expansion valve to be opened by a designated opening degree, during the pressure equilibrium time measured by the timer, in case that one or more compressors are stopped in accordance with the variation of the cooling/heating load and then re-operated.

Preferably, the microcomputer may set the designated opening degree of the electronic expansion valve so that the pressure equilibrium time is minimized, and control the electronic expansion valve to be completely closed when the pressure equilibrium in the compressors is achieved.

In accordance with still another aspect of the present invention, there is provided a method for controlling an electronic expansion valve of an air conditioner, comprising the steps of: (a) stopping one or more of a plurality of operating compressors in accordance with the decrease of a cooling/heating load; and (b) controlling the electronic expansion valve to be opened by a designated opening degree so that the pressure equilibrium in the stopped compressor(s) is rapidly achieved, in case that the cooling/heating load is increased after the stoppage of the operating compressors in the step (a).

Preferably, the step (b) may include the step of controlling the electronic expansion valve to be completely closed, after the pressure equilibrium in the stopped compressor(s) is achieved.

Further, preferably, the designated opening degree in step (b) may be the minimum degree allowing pressures at inlet and outlet pipes connected to the stopped compressor(s) to reach equilibrium within a set time, and the set time may be the total sum of a first necessary time taken to allow the pressures at the inlet and the outlet pipes of the stopped compressor(s) to reach equilibrium and a second necessary time taken to allow the electronic expansion valve to be controlled to be closed.

Here, the first necessary time is the same as a time taken to allow the pressures at the inlet and outlet pipes of the stopped compressor(s) to reach equilibrium under the condition in which the electronic expansion valve is completely opened.

In accordance with yet another aspect of the present invention, there is provided a method for controlling an electronic expansion valve of an air conditioner, comprising the steps of: (a) stopping one or more of a plurality of operating compressors in accordance with the decrease of a cooling/heating load; (b) controlling the electronic expansion valve to be opened by a designated opening degree so that the pressure equilibrium in the stopped compressor(s) is rapidly achieved in case that the cooling/heating load is increased after the stoppage of the operating compressors in the step (a); and (c) controlling the electronic expansion valve to be completely closed, after the pressure equilibrium in the stopped compressor(s) is achieved in the step (b).

Preferably, the designated opening degree of step (b) may be the minimum degree allowing pressures at inlet and outlet pipes connected to the stopped compressor(s) to reach equilibrium within a set time, and the set time may be the same as a time taken to allow the pressures at the inlet and outlet pipes of the stopped compressor(s) to reach equilibrium under the condition in which the electronic expansion valve is completely opened.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
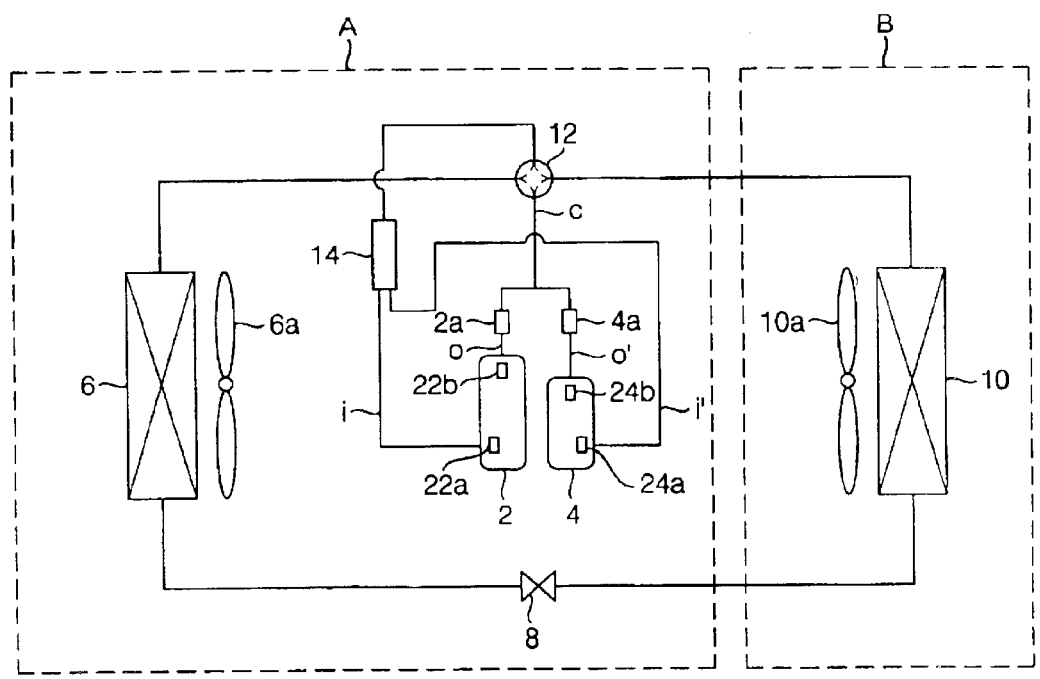
FIG. 1 is a schematic view of an air conditioner of the present invention.

As shown in FIG. 1, an air conditioner in accordance with the present invention comprises an outdoor unit (A) installed outdoors for compressing, condensing and expanding a refrigerant in a cooling mode, an indoor unit (B) installed indoors so as to be connected to the outdoor unit (A) by a refrigerant pipe for evaporating the refrigerant in the cooling mode, and a microcomputer (C) for controlling operations of compressors and an electronic expansion valve of the outdoor unit (A).

Here, the outdoor unit (A) includes first and second compressors 2 and 4, an outdoor heat exchanger 6, an outdoor fan 6a, an electronic expansion valve 8, an oil separation unit 14, and a refrigerant pipe, for connecting such components, provided with a plurality of check valves 2a and 4a installed therein. The indoor unit (B) includes an indoor heat exchanger 10 and an indoor fan 10a.

More specifically, outlet pipes o and o' are connected to one of the ends of the first and second compressors 2 and 4, respectively. In order to prevent the backflow of the refrigerant into the first and second compressors 2 and 4, the first and second check valves 2a and 4a are installed in the outlet pipes o and o'. A connection pipe c is connected to the outlet pipes o and o' so that the refrigerants discharged via the two outlet pipes o and o' are combined together therein and then guided to a condenser, an expansion device and an evaporator during an air conditioning cycle.

Inlet pipes i and i' are branched from the end of the connection pipe c, and then connected to the first and second compressors 2 and 4 so as to guide the refrigerant to the first and second compressors 2 and 4. The oil separation unit 14 is positioned between the connection pipe c and the inlet pipes i and i', and serves to separate oil discharged together with the refrigerant from the first and second compressors 2 and 4, to supply the separated oil to each of the first and second compressors 52 and 54, and to prevent the refrigerant from being introduced into the first and second compressors 2 and 4.

Here, a direction change valve 12 for selectively controlling the flow direction of the refrigerant is installed in the connection pipe c connected to the ends of the first and second check valves 2a and 4a. The direction change valve 12 allows the refrigerant compressed by the first and second compressors 2 and 4 to flow toward the outdoor heat exchanger 6, thereby forming a cooling cycle of an air conditioning system, or to flow toward the indoor heat exchanger 10, thereby forming a heating cycle of the air conditioning system.

The first and second compressors 2 and 4 have different refrigerant compression capacities respectively such that the refrigerant compression capacity of the first compressor 2 is X % of the total refrigerant compression capacity of the air conditioner and the refrigerant compression capacity of the second compressor 4 is (100−X)% of the total refrigerant compression capacity of the air conditioner. The refrigerant compression capacity of the first compressor 2 is larger than the refrigerant compression capacity of the second compressor 4. The first and second compressors 2 and 4 are simultaneously or selectively operated according to the cooling or heating load to be eliminated.

The electronic expansion valve 8 adjusts the opening degree of a passage, through which the refrigerant passes, by means of a step motor, thereby controlling the flow rate of the refrigerant circulating through an air conditioning system. The opening degree of the electronic expansion valve 8 is controlled according to the cooling or heating load.

The outdoor fan 10a is installed adjacent to one side of the outdoor heat exchanger 10, and the indoor fan 6a is installed adjacent to one side of the indoor heat exchanger 6. Accordingly, the rotating speeds of the outdoor fan 10a and the indoor fan 6a are changed according to the variation of the cooling or heating load, thereby controlling the amount of circulation of outdoor air and indoor air, respectively.

The microcomputer (C) of the air conditioner controls the operation of the first and second compressors 2 and 4, the opening degree of the electronic expansion valve 8, and the rotating speeds of the outdoor and indoor fans 6a and 10a. Particularly, the microcomputer (C) of the air conditioner controls the operations of the first and second compressors 2 and 4, the electronic expansion valve 8 and the outdoor and indoor fans 6a and 10a so that a current degree of superheat reaches a target degree of superheat.

Here, the current degree of superheat is determined by a difference between the temperature of the refrigerant at the inlet pipes i and i' of the compressors and the temperature of the refrigerant at the evaporator, and the target degree of superheat according to the refrigerant compression capacity and the outdoor temperature is inputted to the microcomputer (C) in advance.

Particularly, in case that at least one of the first and second compressors 2 and 4 is stopped and then re-operated, the microcomputer (c) suitably controls the opening degree of the electronic expansion valve 8, thereby rapidly achieving the pressure equilibrium between the inlet pipes i and i' and the outlet pipes o and o' of the re-operating compressors 2 and 4.

Figure 2:
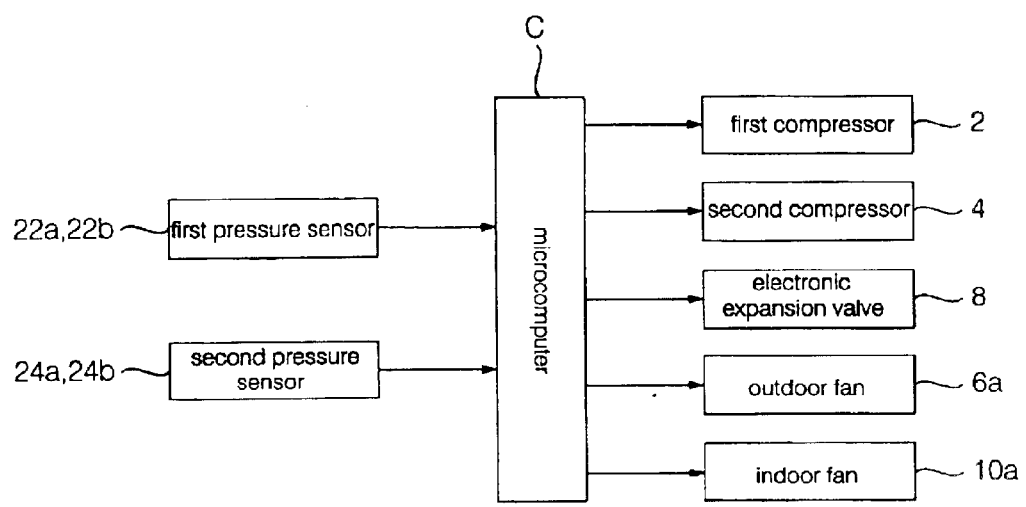
FIG. 2 is a block diagram of one embodiment of a unit for controlling an electronic expansion valve of the air conditioner of the present invention.

As shown in FIG. 2, the air conditioner of the present invention further comprises first pressure sensors 22a and 22b, respectively installed at the inlet pipe i and the outlet pipe o of the first compressor 2, for measuring the pressures at the inlet pipe i and the outlet pipe o of the first compressor 2, and second pressure sensors 24a and 24b, respectively installed at the inlet pipe i' and the outlet pipe o' of the second compressor 4, for measuring the pressures at the inlet pipe i' and the outlet pipe o' of the second compressor 4. In case that at least one of the first and second compressors 2 and 4 is re-operated, the pressures at the inlet pipe(s) i and/or i' and the outlet pipe o and/or o' of the re-operating compressor(s) 2 and/or 4 are measured by the first pressure sensors 22a and 22b and the second pressure sensors 24a and 24b, and then inputted into the microcomputer (C). Then, the microcomputer (C) controls the opening degree of the electronic expansion valve 8 so that the pressure equilibrium between the inlet pipes i and/or i' and the outlet pipes o and/or o' of the re-operating compressor(s) 2 and/or 4 is achieved.

Figure 3:
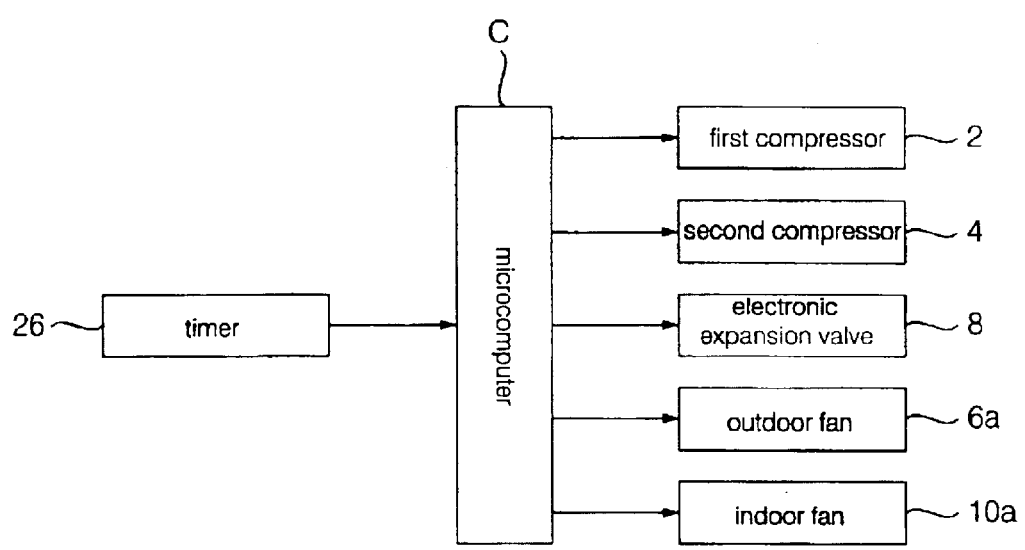
FIG. 3 is a block diagram of another embodiment of the unit for controlling the electronic expansion valve of the air conditioner of the present invention.

As shown in FIG. 3, the air conditioner of the present invention further comprises a timer 26 to which a pressure equilibrium time ($T_0$), taken to allow the pressures at the inlet pipe(s) and the outlet pipe(s) of the re-operating compressor(s) to reach equilibrium, is inputted in advance. In case that at least one of the first and second compressors 2 and 4 is re-operated, the electronic expansion valve 8 is controlled to be opened by a designated opening degree ($P_0$) while the pressure equilibrium time ($T_0$) elapses, thereby achieving the pressure equilibrium between the inlet pipes i and/or i' and the outlet pipes o and/or o' of the re-operating compressor(s) 2 and/or 4.

In case that the electronic expansion valve 8 is controlled to be completely opened, the pressure equilibrium time ($T_0$) is the shortest. On the other hand, in case that the electronic expansion valve 8 is controlled to be opened by the designated opening degree ($P_0$), the shortened degree of the pressure equilibrium time ($T_0$) is lower than the increased degree of the designated opening degree. Accordingly, the electronic expansion valve 8 is controlled to be opened by the designated opening degree ($P_0$).

When the flow rate of the refrigerant is controlled in accordance with the cooling/heating load, the electronic expansion valve 8 is controlled to be closed and then opened again by a suitable opening degree. Accordingly, in order to shorten the time taken to allow the electronic expansion valve 8 to be opened and closed, the electronic expansion valve 8 must be controlled to be opened by the designated opening degree ($P_0$).

Figure 4:
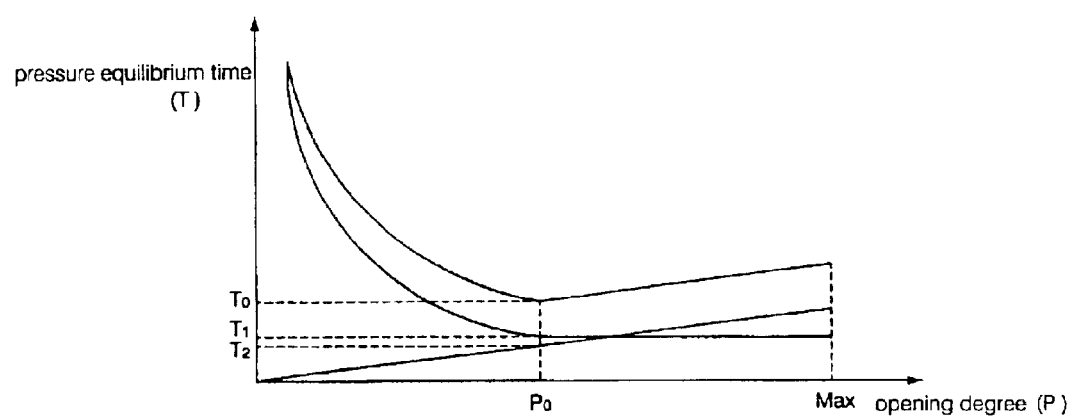
FIG. 4 is a graph illustrating a time taken to allow compressors to be re-operated according to an opening degree of the electronic expansion valve of the air conditioner of the present invention.

As shown in FIG. 4, the pressure equilibrium time ($T_0$) may refer to a second necessary time ($T_2$) taken to allow the electronic expansion valve 8 opened by the designated opening degree ($P_0$) to be controlled to be completely closed as well as a first necessary time ($T_1$) taken to allow the pressures at the inlet pipe(s) and the outlet pipe(s) of the re-operating compressor(s) to reach equilibrium.

Now, a more specific process for determining the designated opening degree ($P_0$) and the pressure equilibrium time ($T_0$) is described in detail. As shown in FIG. 4, the designated opening degree ($P_0$) is the minimum degree allowing the stopped compressor(s) to be re-operated within the pressure equilibrium time ($T_0$), and the pressure equilibrium time ($T_0$) is the minimum time taken to allow the stopped compressor(s) to be re-operated and refers to the total sum of the first necessary time ($T_1$) and the second necessary time ($T_2$).

Here, the first necessary time ($T_1$) is a necessary time taken to allow the pressures at the inlet pipe(s) and the outlet pipe(s) of the stopped compressor(s) to reach equilibrium, and the second necessary time ($T_2$) is a necessary time taken to allow the electronic expansion valve 8 opened by the designated opening degree ($P_0$) to be controlled to be completely closed.

That is, in case that the electronic expansion valve 8 is maintained such that it is opened by the designated opening degree ($P_0$) during the first necessary time ($T_1$) and then controlled such that it is completely closed during the second necessary time ($T_2$), the time taken to allow the stopped compressor(s) to be re-operated can be most shortened.

In the above-described air conditioner, the plural compressors are selectively operated and stopped in accordance with the cooling/heating load. Hereinafter, with reference to FIGS. 5 to 7, a method for controlling the air conditioner and the electronic expansion valve of the air conditioner so as to shorten the time taken to allow the stopped compressor(s) to be re-operated is described in detail.

First, a user selects one of cooling and heating modes, and sets a desired target temperature. Then, one or both of the first and second compressors 2 and 4 are operated in accordance with a cooling or heating load to be eliminated in a room (S1).

Here, the cooling or heating load is determined by a difference between a current degree of superheat and a target degree of superheat, thereby controlling the operation of the air conditioner.

Figure 5:
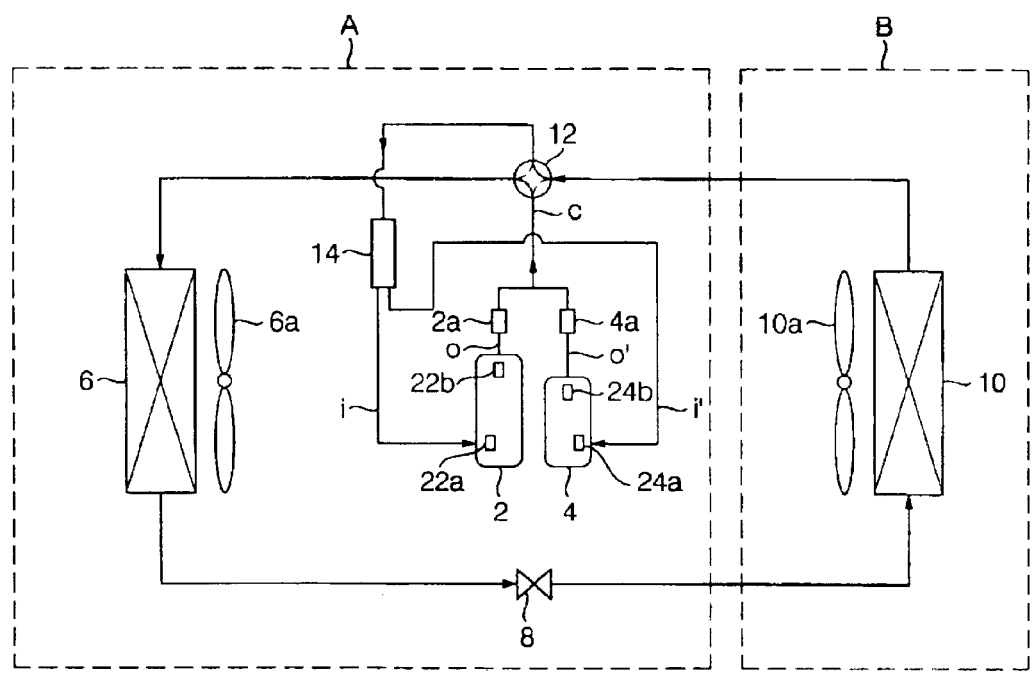
FIG. 5 is a schematic view of a refrigerant flow in a cooling mode of the air conditioner of the present invention.

More specifically, in case that the cooling mode is selected by the user, as shown in FIG. 5, the outdoor heat exchanger 6 functions as a condenser and the indoor heat exchanger 10 functions as an evaporator. The direction change valve 12 guides the refrigerant exhausted from the first and second compressors 2 and 4 to the outdoor heat exchanger 6 so that the refrigerant circulates through the first and second compressors 2 and 4, the outdoor heat exchanger 6, the electronic expansion valve 8, and the indoor heat exchanger 10, sequentially.

Figure 6:
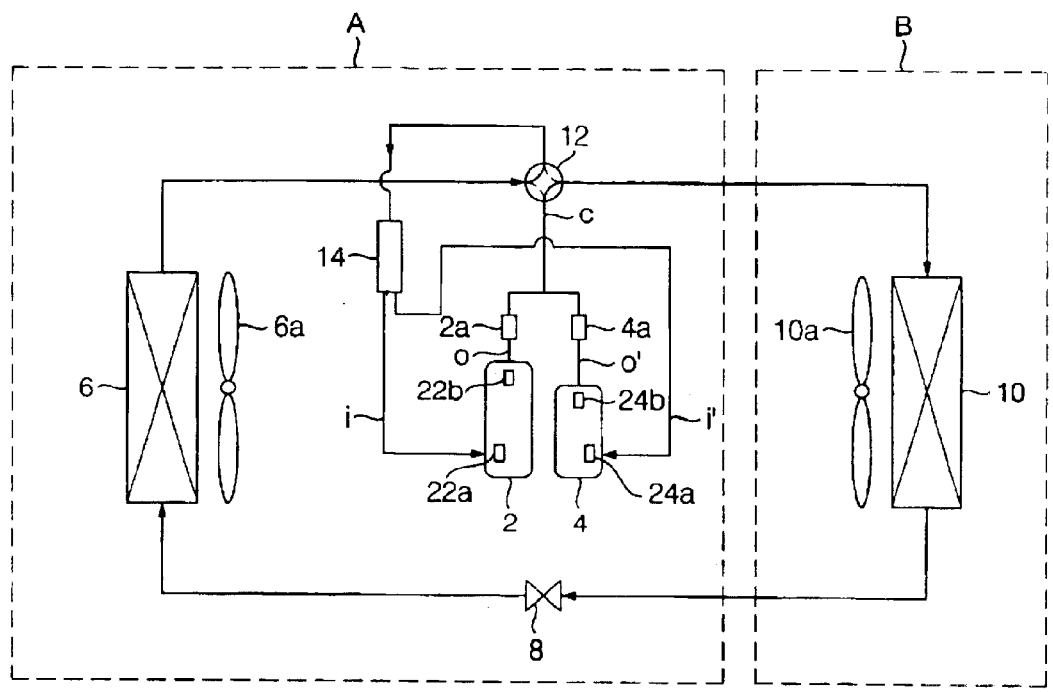
FIG. 6 is a schematic view of a refrigerant flow in a heating mode of the air conditioner of the present invention.
Figure 7:
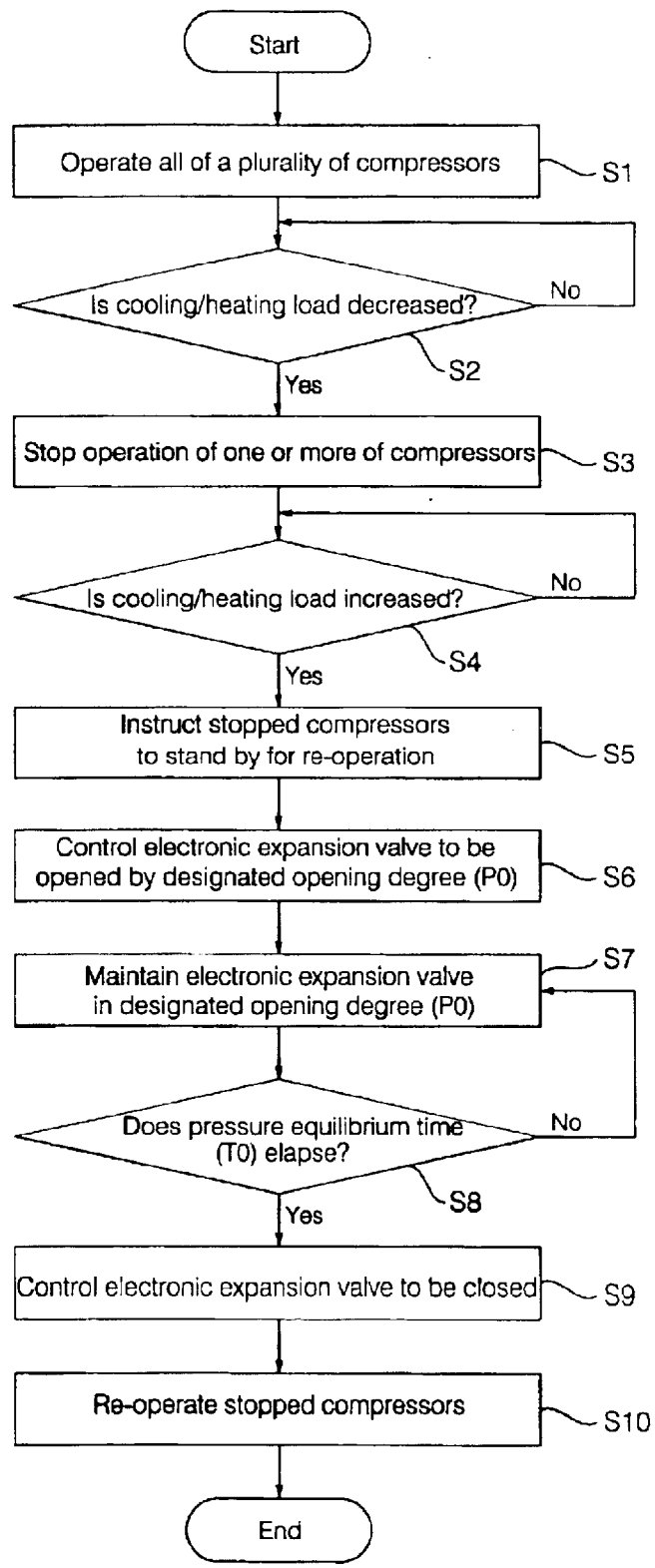
FIG. 7 is a flow chart illustrating a method for controlling the electronic expansion valve of the air conditioner of the present invention.

On the other hand, in case that the heating mode is selected by the user, as shown in FIG. 6, the outdoor heat exchanger 6 functions as an evaporator and the indoor heat exchanger 10 functions as a condenser. The direction change valve 12 guides the refrigerant exhausted from the first and second compressors 2 and 4 to the indoor heat exchanger 10 so that the refrigerant circulates through the first and second compressors 2 and 4, the indoor heat exchanger 10, the electronic expansion valve 8, and the outdoor heat exchanger 6, sequentially.

In order to rapidly eliminate the cooling or heating load, the first and second compressors 2 and 4 are simultaneously operated at an initial stage so that the total refrigerant compression capacity of the first and second compressors 2 and 4 is the maximum.

Second, in case that the cooling/heating load is decreased by the operation of the air conditioner in step S1, one or both of the first and second compressors 2 and 4 are stopped (S2 and S3).

Generally, in case that the current degree of superheat coincides with the target degree of superheat, one or both of the first and second compressors 2 and 4 are stopped.

Third, in case that one or both of the first and second compressors 2 and 4 are stopped in step S3, the air conditioner continuously senses the cooling/heating load. Then, in case that the cooling/heating load is increased, the stopped compressor(s) stand by for re-operation (S4 and S5).

On the other hand, in case that the cooling/heating load is not increased, the stopped compressor(s) maintain their stopped states.

Fourth, the electronic expansion valve 8 is controlled to be opening by the designated opening degree ($P_0$), and then maintains its opening state, during a period when the stopped compressor(s) stand by for re-operation in step S5 (S6 and S7).

Here, the opening degree (P) of the electronic expansion valve 8 is controlled by the step motor to be the designated opening degree ($P_0$). The designated opening degree ($P_0$) is inputted in advance to the microcomputer (C), thereby allowing the operation of the electronic expansion valve 8 to be controlled.

More specifically, the refrigerant in a high-pressure state at the outlet(s) of the stopped compressor(s) rapidly passes through the electronic expansion valve 8, and then is introduced into the inlet(s) of the stopped compressor(s), thereby rapidly achieving the pressure equilibrium between the inlet(s) and the outlet(s) of the stopped compressor(s).

Fifth, after the pressure equilibrium time ($T_0$) elapses under the condition in which the designated opening degree ($P_0$) of the electronic expansion valve 8 is maintained in step S7, the electronic expansion valve 8 is controlled to be closed (S8 and S9).

Here, the pressure equilibrium time ($T_0$) is the first necessary time ($T_1$) taken to allow the pressures at the inlet pipe(s) and the outlet pipe(s) of the stopped compressor(s) to reach equilibrium in case that the electronic expansion valve 8 is opened by the designated opening degree ($P_0$). Accordingly, The first necessary time ($T_1$) of this case is the same as the time taken to allow the pressures at the inlet pipe(s) and the outlet pipe(s) of the stopped compressor(s) to reach equilibrium under the condition in which the electronic expansion valve 8 is completely opened.

That is, although the electronic expansion valve 8 is opened by an opening degree more than the designated opening degree ($P_0$), the first necessary time ($T_1$) taken to allow the pressures at the inlet pipe(s) and the outlet pipe(s) of the stopped compressor(s) to reach equilibrium is constant.

Of course, the pressure equilibrium time ($T_0$) may further include the second necessary time ($T_2$) taken to allow the electronic expansion valve 8 opened by the designated opening degree ($P_0$) to be controlled to be closed.

Consequently, the electronic expansion valve 8 maintains its opening state by the designated opening degree ($P_0$) during the first necessary time ($T_1$) so that the pressure equilibrium between the inlet pipe(s) and the outlet pipe(s) of the stopped compressor(s) is achieved, and then is controlled to be closed during the second necessary time ($T_2$).

Sixth, in case that the electronic expansion valve 8 is controlled to be closed in step S9, the stopped compressor(s) are re-operated (S10).

Here, the opening degree of the electronic expansion valve 8 as well as to the operations of the first and second compressors 2 and 4, the outdoor fan 6a, and the indoor fan 10a is controlled in accordance with the cooling/heating load.

The air conditioner and the method for controlling the electronic expansion valve of the air conditioner in accordance with the present invention have several advantages, as follows.

First, the air conditioner of the present invention comprises a plurality of compressors in which one or more compressors are operated according to a cooling or heating load, a plurality of pressure sensors for measuring pressures at inlet and outlet pipes of stopped compressor(s) in case that the stopped compressor(s) are re-operated, and a microcomputer for controlling the electronic expansion valve to be opened by a designated opening degree so that the pressures at the inlet and outlet pipes of the re-operating compressor(s) rapidly reach equilibrium, thereby rapidly achieving the pressure equilibrium between the inlet and outlet pipes of the re-operating compressor(s) and shortening a time taken to allow the compressor(s) to be re-operated. Further, since the electronic expansion valve, which is opened by the designated opening degree, is controlled to be closed when the pressure equilibrium between the inlet and outlet pipes of the re-operating compressor(s) is achieved, a time taken to allow the opening degree of the electronic expansion valve to be controlled is shortened, thereby shortening a time taken to allow noise to be generated in controlling the opening degree of the electronic expansion valve as well as the time taken to allow the compressor(s) to be re-operated.

Second, the method for controlling the electronic expansion valve of the air conditioner of the present invention comprises a step of controlling the electronic expansion valve to be opened by a designated opening degree during a pressure equilibrium time so that the flow rate of a refrigerant is suitably controlled in case that one or more of the compressors are re-operated according to the decrease of the cooling/heating load, thereby rapidly achieving the pressure equilibrium between the inlet and outlet pipes of the re-operating compressor(s) and shortening the time taken to allow the compressor(s) to be re-operated. Further, the method of the present invention re-operates the stopped compressor(s) after the pressure equilibrium between the inlet and outlet pipes of the re-operating compressor(s) is completely achieved, thereby increasing reliability in operating the compressor(s).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air conditioner comprising:
   a plurality of compressors, for compressing a refrigerant, of which at least one compressor is operated so that refrigerant compression capacity is variably changed according to the variation in a cooling/heating load;
   inlet pipes allowing the refrigerant to be distributed to the compressors, and outlet pipes allowing the refrigerant from the compressors to be exhausted;
   a condenser for condensing the refrigerant compressed by the compressors by transferring heat between the refrigerant and air;
   an electronic expansion valve for expanding the refrigerant condensed by the condenser by passing the refrigerant through an expansion passage; and
   a microcomputer for controlling the electronic expansion valve to be opened by a designated opening degree so that the pressure equilibrium in the compressors is rapidly achieved when, at least one of the compressors is stopped in accordance with the variation in the cooling/heating load and then the at least one stopped compressor is restarted.

2. The air conditioner as set forth in claim 1, further comprising:
a plurality of pressure sensors respectively installed at the inlet and outlet pipes connected to the compressors for measuring pressures at said inlet and outlet pipes,
wherein the microcomputer controls the electronic expansion valve to be opened by the designated opening degree during a period when the pressure sensed by the pressure sensors at the inlet and outlet pipes connected to the at least one restarting compressor is adjusting towards equilibrium.

3. The air conditioner as set forth in claim 1, further comprising:
a timer, to which a pressure equilibrium time, which is the time taken to allow pressures at the inlet and the outlet pipes connected to the compressors to reach equilibrium, is inputted in advance,
wherein the microcomputer controls the electronic expansion valve to be opened by the designated opening degree for the pressure equilibrium time as measured by the timer.

4. The air conditioner as set forth in claim 3, wherein the microcomputer sets the designated opening degree of the electronic expansion valve so that the pressure equilibrium time is minimized.

5. The air conditioner as set forth in claim 1, wherein the microcomputer controls the electronic expansion valve to be completely closed when the pressure equilibrium in the compressors is achieved.

6. An air conditioner comprising:
a plurality of compressors, for compressing a refrigerant, of which at least one compressor is operated so that refrigerant compression capacity is variably changed according to the variation in a cooling/heating load;
inlet pipes allowing the refrigerant to be distributed to the compressors, and outlet pipes allowing the refrigerant from the compressors to be exhausted;
a condenser for condensing the refrigerant compressed by the compressors by transferring heat between the refrigerant and air;
an electronic expansion valve for expanding the refrigerant condensed by the condenser by passing the refrigerant through an expansion passage;
a plurality of pressure sensors respectively installed at the inlet and outlet pipes for measuring pressures at said inlet and outlet pipes; and
a microcomputer for controlling the electronic expansion valve to be opened by a designated opening degree when at least one of the compressors is stopped in accordance with the variation in the cooling/heating load and then restarted, during a period when the pressures at the inlet and outlet pipes sensed by the pressure sensors are adjusting towards equilibrium.

7. The air conditioner as set forth in claim 6, wherein the microcomputer controls the electronic expansion valve to be completely closed when the pressure equilibrium in the compressors is achieved.

8. An air conditioner comprising:
a plurality of compressors, for compressing a refrigerant, of which at least one compressor is operated so that refrigerant compression capacity is variably changed according to the variation in a cooling/heating load;
inlet pipes allowing the refrigerant to be distributed to the compressors, and outlet pipes allowing the refrigerant from the compressors to be exhausted;
a condenser for condensing the refrigerant compressed by the compressors by transferring heat between the refrigerant and air;
an electronic expansion valve for expanding the refrigerant condensed by the condenser by passing the refrigerant through an expansion passage;
a timer, to which a pressure equilibrium time, which is the time taken to allow pressures at the inlet and the outlet pipes of at least one restarting compressor to reach equilibrium, is inputted in advance, the at least one restarting compressor being stopped in accordance with variation in the cooling/heating load and then restarted, and
a microcomputer for controlling the electronic expansion valve to be opened by a designated opening degree; during the pressure equilibrium time measured by the timer.

9. The air conditioner as set forth in claim 8, wherein the microcomputer sets the designated opening degree of the electronic expansion valve so that the pressure equilibrium time is minimized.

10. The air conditioner as set forth in claim 8, wherein the microcomputer controls the electronic expansion valve to be completely closed when the pressure equilibrium in the compressors is achieved.

11. A method for controlling an electronic expansion valve of an air conditioner, comprising:
stopping at least one of a plurality of operating compressors in accordance with the decrease in a cooling/heating load; and
controlling the electronic expansion valve to be opened by a designated opening degree so that the pressure equilibrium in the at least one stopped compressor is rapidly achieved, when the cooling/heating load is increased after the stopping of the at least one operating compressor.

12. The method as set forth in claim 11, wherein controlling further comprises controlling the electronic expansion valve to be completely closed, after the pressure equilibrium in the at least one stopped compressor is achieved.

13. The method as set forth in claim 11, wherein the designated opening degree is the minimum degree allowing pressures at inlet and outlet pipes connected to the at least one stopped compressor to reach equilibrium within a set time.

14. The method as set forth in claim 13, wherein the set time is the total of a first necessary time to allow the pressures within the inlet and the outlet pipes of the at least one stopped compressor to reach equilibrium and a second necessary time to allow the electronic expansion valve to be closed.

15. The method as set forth in claim 14, wherein the first necessary time is a time to allow the pressures at the inlet and outlet pipes of the at least one stopped compressor to reach equilibrium when the electronic expansion valve is completely open.

16. A method for controlling an electronic expansion valve of an air conditioner, comprising:

stopping at least one of a plurality of operating compressors in accordance with the decrease in a cooling/heating load;

controlling the electronic expansion valve to be opened by a designated opening degree so that a pressure equilibrium in at least one stopped compressor is rapidly achieved when the cooling/heating load is increased after stopping the at least one of a plurality of operating compressors; and controlling the electronic expansion valve to be completely closed after the pressure equilibrium is achieved in the at least one stopped compressor.

17. The method as set forth in claim 16, wherein the designated opening degree is the minimum degree allowing pressures at inlet and outlet pipes connected to the at least one stopped compressor to reach equilibrium within a set time.

18. The method as set forth in claim 17, wherein the set time is a time to allow the pressures at the inlet and outlet pipe(s) of the at least one stopped compressor to reach equilibrium when the electronic expansion valve is completely open.

* * * * *

UNITED STATES PATENT AND TRADEMARK OFFICE
CERTIFICATE OF CORRECTION

| | |
|---|---|
| PATENT NO. | : 6,843,067 B2 |
| DATED | : January 18, 2005 |
| INVENTOR(S) | : W.H. Lee |

It is certified that error appears in the above-identified patent and that said Letters Patent is hereby corrected as shown below:

Column 11,
Line 1, after "when" delete ",".

Column 12,
Line 20, after "degree" delete ";".
Line 40, after "achieved" delete ",".

Signed and Sealed this

Thirteenth Day of September, 2005

JON W. DUDAS
*Director of the United States Patent and Trademark Office*